UNITED STATES PATENT OFFICE.

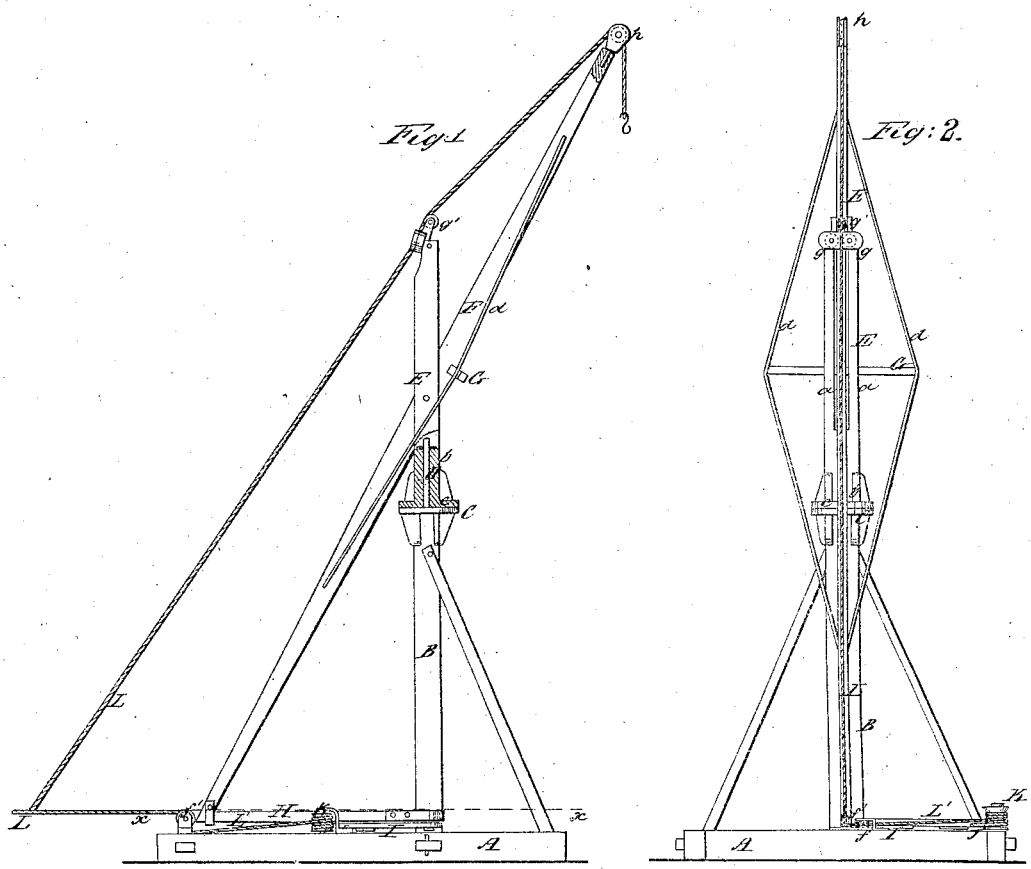
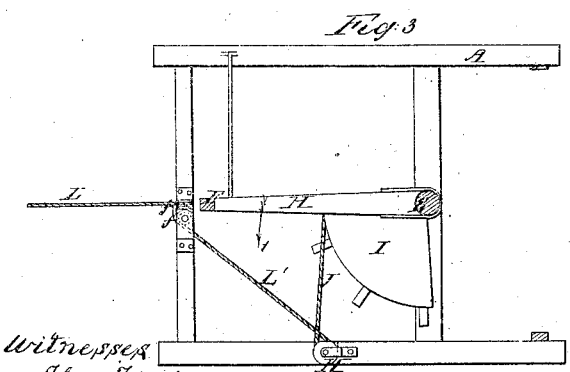

WILLIAM MINICK, OF KANSAS, ILLINOIS.

IMPROVED HAY-DERRICK.

Specification forming part of Letters Patent No. 50,150, dated September 26, 1865.

*To all whom it may concern:*

Be it known that I, WILLIAM MINICK, of Kansas, in the county of Edgar and State of Illinois, have invented a new and Improved Hay-Elevator; and I do hereby declare that the following is a full, clear, and exact description thereof, which will enable others skilled in the art to make and use the same, reference being had to the accompanying drawings, forming part of this specification, in which—

Figure 1 is a side view of my invention, partly in section; Fig. 2, a front view of the same; Fig. 3, a horizontal section of the same.

Similar letters of reference indicate like parts.

This invention relates to a new and improved machine for elevating hay; and it consists in a novel construction and arrangement of the parts, as hereinafter fully shown and described, whereby a very simple and efficient device is obtained for the purpose, and one which may be operated with but little labor.

A represents a horizontal frame on which an upright, B, is permanently secured, having a circular plate, C, on its upper end, and also an upright rod, D. (See Fig. 1.)

E represents a swivel upright, composed of two vertical parallel parts, *a a*, with a block, *b*, secured between their lower ends, in which the rod D is fitted, the lower end of E being provided with a circular plate, *c*, which rests on the plate C of the upright B. The upright E is by this arrangement allowed to turn freely on B, and at the same time prevented from being casually detached from it.

F represents a bar which has an inclined position and is permanently secured between the parts *a a* of the swivel upright E. This bar F is braced and rendered stiff by means of a transverse bar, G, secured to it near the swivel upright E, and iron rods *d d*, which are attached to both sides of F, pass over the ends of G. (See Fig. 2.) The lower end of the bar F is secured to the outer end of a horizontal bar, H, the inner end of which is secured by a metal strap, *e*, on the lower part of the upright B so that it may turn freely thereon. The bar H has a segment, I, permanently secured to it, and to this segment there is secured a rope, J, which works on a pulley, K, at one side of frame A.

L represents the hoisting-rope, which is attached to the pulley K, and has a branch rope, L', attached to it, which passes around and under guide-pulleys *f f'* on the frame A, and is attached to pulley K. The hoisting-rope L passes upward and between and over guide-pulleys *g g'* at the top of the swivel upright E, and over a swivel pulley, *h*, at the upper end of bar F. The horse is connected to the lower end of the hoisting-rope L, the fork being attached to its opposite end, and when the fork is down ready to be loaded the bar F is in a plane which is transverse with the frame A. When the fork is loaded and the horse started the bar F is turned in the direction indicated by arrow 1, and the branch rope L is wound upon the pulley K, the latter being turned by the rope J and segment I. By this means the loaded fork is elevated and at the same time turned over the spot or stack where the hay is to be deposited. When the bar F is turned back to its original position by backing the horse the fork at the end of L will descend by its own gravity and the ropes J L be wound upon pulley K.

I would remark that the pulleys K *f f'* may be adjusted so that hay may be elevated at either side of the machine.

This device may be very readily operated and with but a moderate expenditure of power. It may be cheaply constructed, is strong and durable, and the work of elevating and stacking hay can be performed very expeditiously. The swivel pulley *h* turns and conforms to the swing of the rope L in any direction.

Having thus described my invention, I claim as new and desire to secure by Letters Patent—

1. The swivel upright E, applied to the permanent upright B, in combination with the inclined bar F, secured to E, and connected to the lower part of B by the bar H, all arranged, substantially as shown, to form a new and improved crane for a hay-elevating device.

2. The segment I, attached to the bar H, in combination with the rope J, pulley K, and the hoisting and branch ropes L L', all arranged, in combination with the crane, to operate in the manner substantially as and for the purpose set forth.

3. The bracing of the inclined bar F by means of the transverse bar G and iron rods *d d*, substantially as and for the purpose described.

WM. MINICK.

Witnesses:
THOMAS LAUGHEAD,
P. L. MINK.